Patented Apr. 6, 1954

UNITED STATES PATENT OFFICE 2,674,601

DYESTUFFS OF THE PHTHALOCYANINE SERIES AND A PROCESS OF PRODUCING SAME

Arnold Tartter, Lambsheim, Germany, assignor to Badische Anilin- & Soda-Fabrik Aktiengesellschaft, Ludwigshafen (Rhine), Germany No Drawing. Application December 20, 1950, Serial No. 201,865

Claims priority, application Germany December 29, 1949

5 Claims. (Cl. 260—314.5)

1

This invention relates to dyestuffs of the phthalocyanine series and a process of producing same.

I have found that new dyestuffs of the phthalocyanine series are obtained by reacting phthalocyanines with lactones in the presence of Friedel-Crafts condensing agents.

As initial materials there may be used for example metal-free or metal-containing phthalocyanines, as for example those of copper, cobalt, nickel or iron, and also their substitution products, as for example those containing halogen atoms or nitro, carbamido, sulfamide, phenyl or benzyl groups. Among suitable lactones there may be mentioned for example gamma-butyrolactone, gamma- or delta-valerolactone and higher homologues. The Friedel-Crafts condensing agents, as for example the halides of aluminum, zinc or iron, and boron fluoride, may also be used in the form of their addition compounds with lactones, as for example butyrolactone-boron fluoride.

The reaction may be carried out in the presence of a solvent or diluent, such as tri- or tetrachlorbenzene. A large excess of the lactone employed may also serve as the solvent or diluent. It is advantageous to carry out the reaction in molten aluminum chloride, the melting point of which may be adjusted to the desired temperature for example by the addition of alkali halides or tertiary amines.

Depending on the reaction conditions and the proportions of the reactants, products are obtained having a lower or higher content of carboxyl groups, for example of butyric acid radicles in the case of gamma-butyrolactone. The new phthalocyanines may be used in part as vat dyestuffs and in part as substantive dyestuffs.

The following examples will further illustrate the invention but the invention is not restricted to these examples. The parts are by weight.

Example 1

20 parts of cobalt phthalocyanine are introduced at 150° C. while stirring into a melt of 200 parts of anhydrous aluminum chloride and 50 parts of sodium chloride and then 40 parts of gamma-butyrolactone are allowed to drop in. After stirring for several hours at 150° C., the reaction mixture is poured into ice-water and the precipitated dyestuff is filtered off by suction, washed with water and dried. 27 parts of a dyestuff are thus obtained which dyes cotton from a brown vat fast blue shades.

70 parts of triethylamine may be used instead

2 of 50 parts of sodium chloride and the reaction may be carried out at 60° or 100° C.

By starting from a condensation product of cobalt phthalocyanine and benzotrichloride, instead of from cobalt phthalocyanine itself, a dyestuff is obtained which dyes cotton from a yellow-brown vat greenish blue shades.

Example 2

Into 250 parts of a melt of anhydrous aluminum chloride and sodium chloride of the kind described in Example 1 there are introduced 20 parts of iron phthalocyanine and, while stirring, at 100° C., 50 parts of gamma-butyrolactone are allowed to drop in. After 6 hours the melt at a temperature of 100° C. is poured into ice-water. A green-black dyestuff is thus obtained which dyes cotton from the vat greenish blue shades.

By employing nickel phthalocyanine instead of iron phthalocyanine, the resulting dyestuff dyes cotton greenish blue shades.

Example 3

300 parts of anhydrous aluminum chloride, 70 parts of sodium chloride and 30 parts of metal-free phthalocyanine are fused together. 60 parts of gamma-butyrolactone are allowed to flow into the melt at 120° C. After some hours, the resulting dyestuff is separated in the manner described in Example 1. It dyes cotton from a violet-blue vat green shades.

Example 4

30 parts of copper phthalocyanine are introduced into 300 parts of a melt of anhydrous aluminum chloride and sodium chloride and then 80 parts of gamma-butyrolactone are added dropwise at 150° C. The mixture is stirred for about 10 hours at 150° C. and then cooled to 100° C. and poured into ice-water. The blue substantive dyestuff thus obtained dyes cotton blue shades.

Example 5

Into 200 parts of gamma-butyrolactone at 150° C. there are introduced 20 parts of finely ground cobalt phthalocyanine and 10 parts of sublimed ferric chloride. During some hours the temperature is raised to 180° C. within some hours and the excess of gamma-butyrolactone is then distilled off under reduced pressure. The residue is boiled with 2-normal hydrochloric acid and washed with water. 22 parts of a vattable blue dyestuff are thus obtained.

Example 6

A mixture of 300 parts of trichlorobenzene, 20 parts of finely powdered cobalt phthalocyanine, 10 parts of anhydrous zinc chloride and 50 parts of gamma-butyrolactone is heated at 150° C. for about 8 hours while stirring. The solid product is then filtered off by suction, washed with aqueous alcohol and water and dried. The product may be further purified by dissolution in concentrated sulfuric acid and pouring the solution into water. When stirred with a little water it yields a paste which dyes cotton from the vat blue shades.

*Example 7*

30 parts of anhydrous aluminum chloride or of a mixture of anhydrous iron and zinc chlorides are introduced at 160° C. into a suspension of 20 parts of copper phthalocyanine in 200 parts of gamma-butyrolactone. The mixture is stirred for about 15 hours at the said temperature and is then poured into dilute hydrochloric acid; the residue is filtered off by suction, washed with water and made into a paste after the addition of a little caustic alkali solution. The resulting dyestuff dyes cotton from a neutral bath blue shades.

What I claim is:

1. A process for the production of dyestuffs of the phthalocyanine series which comprises reacting a phthalocyanine in the presence of a catalyst of Friedel-Crafts type at temperatures from 60° C. to 180° C. with lactones selected from the class consisting of gamma-butyrolactone and gamma- and delta valerolactone.

2. A process for the production of dyestuffs of the phthalocyanine series which comprises reacting a metal phthalocyanine in the presence of a catalyst of Friedel-Crafts type at temperatures from 60° C. to 180° C. with lactones selected from the class consisting of gamma-butyrolactone, gamma- and delta-valerolactone.

3. A process for the production of dyestuffs of the phthalocyanine series which comprises reacting a metal phthalocyanine in a melt of anhydrous aluminum chloride at temperatures from 60° C. to 180° C. with lactones selected from the class consisting of gamma-butyrolactone, gamma- and delta-valerolactone.

4. A process for the production of dyestuffs of the phthalocyanine series which comprises reacting a metal phthalocyanine in a melt of anhydrous aluminum chloride and a melting point depressing compound at temperatures from 60° C. to 180° C. with lactones selected from the class consisting of gamma-butyrolactone, gamma- and delta-valerolactone.

5. A process for the production of dyestuffs of the phthalocyanine series which comprises reacting a metal phthalocyanine in a melt of anhydrous aluminum chloride and an alkali metal salt at temperatures from 60° C. to 180° C. with lactones selected from the class consisting of gamma-butyrolactone, gamma- and delta-valerolactone.

No references cited.